US012776851B2

(12) United States Patent
Haag et al.

(10) Patent No.: US 12,776,851 B2
(45) Date of Patent: Oct. 27, 2026

(54) ESTABLISHING A TRANSMISSION FUNCTIONALITY FOR PROVIDING, VIA A TELECOMMUNICATIONS NETWORK, A COMMUNICATION OR CONNECTIVITY SERVICE BETWEEN A FIRST LOCATION AND A SECOND LOCATION BASED ON OPTICAL DATA TRANSMISSION OF A USER-DEFINED OPTICAL SIGNAL

(71) Applicant: Deutsche Telekom AG, Bonn (DE)

(72) Inventors: Thomas Haag, Rodgau (DE); Werner Weiershausen, Eppertshausen (DE)

(73) Assignee: Deutsche Telekom AG, Bonn (DE)

( * ) Notice: Subject to any disclaimer, the term of this patent is extended or adjusted under 35 U.S.C. 154(b) by 230 days.

(21) Appl. No.: 18/704,953

(22) PCT Filed: Oct. 31, 2022

(86) PCT No.: PCT/EP2022/080351
§ 371 (c)(1),
(2) Date: Apr. 26, 2024

(87) PCT Pub. No.: WO2023/078833
PCT Pub. Date: May 11, 2023

(65) Prior Publication Data

US 2025/0007639 A1 Jan. 2, 2025

(30) Foreign Application Priority Data

Nov. 3, 2021 (EP) .................................... 21206264

(51) Int. Cl.
*H04J 14/02* (2006.01)
*H04L 41/5019* (2022.01)
*H04Q 11/00* (2006.01)

(52) U.S. Cl.
CPC ...... *H04J 14/0272* (2013.01); *H04J 14/0267* (2013.01); *H04L 41/5019* (2013.01); *H04Q 11/0062* (2013.01); *H04Q 2011/0064* (2013.01)

(58) Field of Classification Search
CPC ... B32B 2371/00; B32B 27/08; B32B 27/288; B32B 7/12; C08G 77/12; C08G 77/20;
(Continued)

(56) References Cited

U.S. PATENT DOCUMENTS 5,796,479 A * 8/1998 Derickson ............ G01J 3/2803 356/326
6,580,537 B1 * 6/2003 Chang ................ H04J 14/0241 398/79

(Continued)

FOREIGN PATENT DOCUMENTS

EP 2518936 A2 10/2012
EP 2518936 A3 1/2017
WO WO 2018229059 A1 12/2018

OTHER PUBLICATIONS

RFC 6934 (Year: 2013).*

(Continued)

*Primary Examiner* — David C Payne
*Assistant Examiner* — Mohammed Abdelraheem
(74) *Attorney, Agent, or Firm* — Leydig, Voit & Mayer, Ltd.

(57) ABSTRACT

A method for establishing a network-internal transmission functionality for providing, via a telecommunications network, a communication or connectivity service between a first location and a second location based on optical data transmission of a user-defined optical signal includes the following steps: in a first step, the establishment of the network-internal transmission functionality is triggered; and in a second step, the network-internal transmission functionality is established by causing a plurality of optical (Continued)

network nodes to apply at least one transmission path based on at least one piece of transmission path information.

11 Claims, 2 Drawing Sheets

(58) Field of Classification Search
CPC .......... C08K 5/56; C08L 83/00; C09J 183/04; H04J 14/0256; H04J 14/0267; H04J 14/0272; H04L 41/5019; H04L 45/62; H04Q 11/0062; H04Q 2011/0064; H04Q 2011/0088
See application file for complete search history.

(56) References Cited

U.S. PATENT DOCUMENTS

| | | | | |
|---|---|---|---|---|
| 6,925,257 | B2 * | 8/2005 | Yoo | H04L 45/52 398/47 |
| 8,989,591 | B2 * | 3/2015 | Kauffeldt | H04J 14/0254 398/135 |
| 9,648,402 | B2 * | 5/2017 | Clarke | H04J 3/1652 |
| 10,389,469 | B2 * | 8/2019 | Yilmaz | G02B 6/26 |
| 2009/0116847 | A1 * | 5/2009 | Duan | H04B 10/40 398/137 |
| 2017/0019204 | A1 * | 1/2017 | Yilmaz | H04J 14/0212 |
| 2018/0076919 | A1 * | 3/2018 | Yilmaz | H04J 14/0212 |
| 2020/0099546 | A1 * | 3/2020 | Haag | H04L 12/2856 |

OTHER PUBLICATIONS

RFC 6163 (Year: 2011).*
RFC 7446 (Year: 2015).*
Duro, Segment Switching a New Switching Strategy for Optical HPC Networks (Year: 2021).*
Francesco Paolucci et al: “Enabling transparent lambda services between metro and core networks”, Photonic Network Communications, Kluwer Academic Publishers, BO, vol. 23, No. 2, Dec. 6, 2011 (Dec. 6, 2011), pp. 137-147, XP035027605, Germany.
Duro José et al: “Segment Switching: A New Switching Strategy for Optical HPC Networks”, IEEE Access, IEEE, USA, vol. 9, Feb. 9, 2021 (Feb. 9, 2021), pp. 43095-43106, XP011844643.

* cited by examiner

ESTABLISHING A TRANSMISSION FUNCTIONALITY FOR PROVIDING, VIA A TELECOMMUNICATIONS NETWORK, A COMMUNICATION OR CONNECTIVITY SERVICE BETWEEN A FIRST LOCATION AND A SECOND LOCATION BASED ON OPTICAL DATA TRANSMISSION OF A USER-DEFINED OPTICAL SIGNAL

CROSS-REFERENCE TO PRIOR APPLICATIONS

This application is a U.S. National Phase application under 35 U.S.C. § 371 of International Application No. PCT/EP2022/080351, filed on Oct. 31, 2022, and claims benefit to European Patent Application No. EP 21206264.0, filed on Nov. 3, 2021. The International Application was published in English on May 11, 2023 as WO 2023/078833 A1 under PCT Article 21(2).

FIELD

The present invention relates a method for establishing or defining a network-internal transmission functionality for providing, via a telecommunications network, a communication or connectivity service between a first location and at least a second location based on optical data transmission of a user-defined optical signal, wherein the telecommunications network comprises a backbone network and/or an aggregation network as well as an access network, and the telecommunications network and its infrastructure being used to both

- provide end-user communication services and/or IP connectivity to a multitude of end-users connected to the access network, and
- connect the first location and the at least second location via at least access network infrastructure and/or aggregation network infrastructure comprising a plurality of optical network nodes.

Furthermore, the present invention relates to a broadband access network or telecommunications network for establishing or defining a network-internal transmission functionality for providing, via the telecommunications network, a communication or connectivity service between a first location and at least a second location based on optical data transmission of a user-defined optical signal, wherein the telecommunications network comprises a backbone network and/or an aggregation network as well as an access network, and the telecommunications network and its infrastructure being used to both

- provide end-user communication services and/or IP connectivity to a multitude of end-users connected to the access network, and
- connect the first location and the at least second location via at least access network infrastructure and/or aggregation network infrastructure comprising a plurality of optical network nodes.

Additionally, the present invention relates to a system for establishing or defining a network-internal transmission functionality for providing, via a telecommunications network, a communication or connectivity service between a first location and at least a second location based on optical data transmission of a user-defined optical signal, wherein the telecommunications network comprises a backbone network and/or an aggregation network as well as an access network, and the telecommunications network and its infrastructure being used to both

- provide end-user communication services and/or IP connectivity to a multitude of end-users connected to the access network, and
- connect the first location and the at least second location via at least access network infrastructure and/or aggregation network infrastructure comprising a plurality of optical network nodes.

Additionally, the present invention relates to an optical safety and policy entity or functionality or central office point of delivery provided to be used as part of a system or as part of a broadband access network or telecommunications network according to embodiments of the present invention.

Furthermore, the present invention relates to a program and to a computer-readable medium for operating a broadband access network of a telecommunications network according to embodiments of the present invention.

BACKGROUND

The exchange of information in broadband communication systems or telecommunications networks, both in fixed-line as in wireless communication systems (or fixed-line communication networks and mobile communication networks) has already grown dramatically and probably will also grow in the future due to the rapid spread of different data services in such communication networks.

In conventionally known or current telecommunications networks, typically having or comprising broadband access networks and/or aggregation networks that have or comprise central office points of delivery, many end-users or subscribers are connected to be provided with communication services and/or IP connectivity.

Typically in such broadband access networks, end-users or subscribers operate customer premises equipment or home gateway devices in order to establish a (mostly wireline) connection to access nodes of the broadband access network, typically as part of or located at a central office point of delivery.

At such access nodes and/or at the respective central office point of delivery, such communication services and/or IP connectivity are/is provided (to the end-users or subscribers) based on electrical or electronical processing and/or communication technology—hence, even in case the end-users or subscribers are connected to the access node or central office point of delivery using wireline optical data transmission links (such as, e.g., a passive optical network, PON), such end-user data, or, rather, the respective signals carrying these data (in uplink direction), are converted to and processed as electrical signals in the respective access node and/or the respective central office point of delivery, and—in case of a long-distance transmission requirement of at least a part of such (uplink) end-user data—optical signals are used to carry these end-user data, via a backbone part of the network and/or an aggregation part (or ring) of the network, towards other (typically faraway) network entities or network nodes.

According to such a mode of operation of conventionally known telecommunications networks, it might be possible to connect an end-user via an optical data transmission line (such as, e.g., via a passive optical network, PON, or also via a point-to-point optical transmission line), however the respective signals carrying the end-user's data (i.e. the end-user's data, in uplink direction, originating from the end-user's home gateway or customer premises equipment, as well as the end-user's data, in downlink direction, destinated to the end-user's home gateway or customer premises equipment) are necessarily processed as electrical signals by the respective access node and/or by the respective central office point of delivery through which the considered end-user is connected to the telecommunications network.

This also means, on the one hand, at least a twofold conversion from the optical domain towards the electrical domain and from the electrical domain towards the optical domain, and, on the other hand and as a consequence thereof, that it is impossible to transmit a user-defined optical signal between a first location connected to the telecommunications network towards a second location connected to the telecommunications network in a transparent manner without at least physically modifying the user-defined optical signal. Furthermore, providing the communication or connectivity service between the first and second location (based on the user-defined optical signal) not only requires to transmit the user-defined optical signal on the optical data transmission lines associated or linked to the first and second location but, of course, also to transmit the user-defined optical signal internally of the telecommunications network, i.e. via the optical network nodes of the telecommunications network, especially—e.g. in case of a long-distance transmission requirement—using backbone network nodes and/or aggregation (ring) network nodes of the telecommunications network.

SUMMARY

In an exemplary embodiment, the present invention provides a method for establishing a network-internal transmission functionality for providing, via a telecommunications network, a communication or connectivity service between a first location and a second location based on optical data transmission of a user-defined optical signal. The telecommunications network comprises a backbone network and/or an aggregation network as well as an access network, and the telecommunications network is used to (1) provide end-user communication services and/or IP connectivity to a multitude of end-users connected to the access network, and (2) connect the first location and the second location via at least access network infrastructure and/or aggregation network infrastructure comprising a plurality of optical network nodes. The telecommunications network comprises a network orchestrator entity or functionality connected to the plurality of optical network nodes, respectively, and comprising a plurality of pieces of transmission path information. The first location is linked to the telecommunications network via at least one first optical data transmission fiber to an optical safety and policy entity or functionality, and the second location is linked to the telecommunications network via at least one second optical data transmission fiber to a further optical safety and policy entity or functionality. The method comprises the following steps: in a first step, the establishment of the network-internal transmission functionality is triggered; and in a second step, the network-internal transmission functionality is established by causing the plurality of optical network nodes to apply at least one transmission path based on at least one piece of transmission path information.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
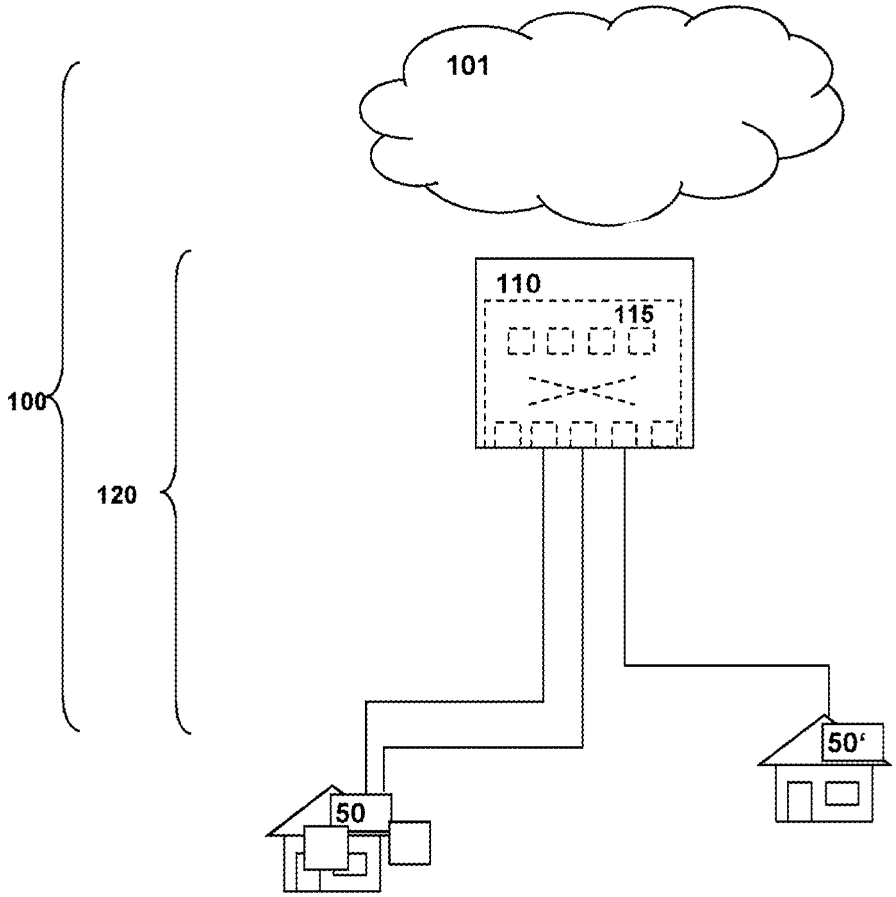
FIG. 1 schematically illustrates a telecommunications network according to the present invention, having a broadband access network with a central office point of delivery, providing end-user communication services and/or IP connectivity to a multitude of end-users connected to the access network.

Exemplary embodiments of the present invention provide a technically simple, effective and cost effective solution for establishing or defining a network-internal transmission functionality for providing, via a telecommunications network, a communication or connectivity service between a first location and at least a second location based on optical data transmission of a user-defined optical signal, wherein the telecommunications network and its infrastructure is able to be used to both provide end-user communication services and/or IP connectivity to end-users, and as well as to connect the first and second location via a plurality of optical network nodes for the user-defined optical signal to be transmitted transparently and essentially without being modified between the first and second location. Further exemplary embodiments of the present invention provide a corresponding broadband access network or corresponding telecommunications network, a corresponding system, a corresponding optical safety and policy entity or functionality or central office point of delivery comprising an optical safety and policy entity or functionality, and an optical network node.

Exemplary embodiments of the present invention are achieved by a method for establishing or defining a network-internal transmission functionality for providing, via a telecommunications network, a communication or connectivity service between a first location and at least a second location based on optical data transmission of a user-defined optical signal, wherein the telecommunications network comprises a backbone network and/or an aggregation network as well as an access network, and the telecommunications network and its infrastructure being used to both

- provide end-user communication services and/or IP connectivity to a multitude of end-users connected to the access network, and
- connect the first location and the at least second location via at least access network infrastructure and/or aggregation network infrastructure comprising a plurality of optical network nodes, wherein the telecommunications network comprises a network orchestrator entity or functionality connected to the plurality of optical network nodes, respectively, and comprising a plurality of pieces of transmission path information, wherein the first location is linked to the telecommunications network via at least one first optical data transmission fiber to an optical safety and policy entity or functionality, and wherein the second location is linked to the telecommunications network via at least one second optical data transmission fiber) to a further optical safety and policy entity or functionality, wherein, in order to establish or to define the network-internal transmission functionality between, on the one hand, the optical safety and policy entity or functionality, and, on the other hand, the further optical safety and policy entity or functionality, the method comprises the following steps:

- in a first step, the establishment or definition of the network-internal transmission functionality is triggered,
- in a second step, the network-internal transmission functionalities established by causing the plurality of optical network nodes to apply at least one transmission path based on at least one piece of transmission path information.

It is thereby advantageously possible according to the present invention to provide an optical point-to-point transmission solution between the optical safety and policy entity or functionality and the further optical safety and policy entity or functionality such that the user-defined optical signal is transmitted, through the telecommunications network and all its considered (optical) network nodes, i.e. using the network-internal transmission functionality, in an essentially unmodified manner (except, of course, for physically inevitable signal distortions, dispersion and/or attenuations along the optical transmission path), i.e. the user-defined optical signal—transported or transmitted in the direction from the optical safety and policy entity or functionality to the further optical safety and policy entity or functionality, and transmitted by an optical hardware device at the first location—is able to be received, via a further optical receiver hardware at the second location, essentially as it has been transmitted or sent, i.e. especially it is received, e.g. using the same optical modulation scheme, as it was transmitted. Hence, it is advantageously possible according to the present invention to provide an optical service between the first and second location of the telecommunications network in the form of a so-called lambda-service, especially for business customers of the telecommunications network, while still providing end-user communication services and/or IP connectivity to a multitude of end-users using the same backbone network and/or aggregation network infrastructure of the telecommunications network. Such business customers are often other carriers (i.e. operators of other telecommunications networks) within wholesale contracts, such as, e.g., 5G mobile network operators, MNO, who could use lambda services as transport enablers, e.g. for mobile front- and backhaul. According to the present invention, a lambda service allows for the freedom of the user to produce any kind of protocol or bandwidth (between the first and second location (and, in consequence, also between the optical safety and policy entity or functionality and the further optical safety and policy entity or functionality), i.e. the user-defined optical signal is completely user-defined and the operator of the transport telecommunications network (providing the forwarding of the user-defined optical signal between the first and second location) only provides the—especially all-optical—transmission or forwarding functionality (between the first and second location) without interfering and/or imposing conditions regarding the user-defined optical signal other than conditions such as to assure the functionality and to avoid damage to the optical transmission network of the telecommunications network).

Furthermore, according to the present invention, it is advantageously possible to comparatively easily establish or define the network-internal transmission functionality (between the optical safety and policy entity or functionality and the further optical safety and policy entity or functionality) for providing, via a telecommunications network, a communication or connectivity service between the first location and the second location based on optical data transmission of a user-defined optical signal, wherein the user-defined optical signal is characterized by an optical modulation scheme, and the optical modulation scheme is maintained throughout the optical transmission path. According to the present invention this is realized via switching the optical network nodes as part of the telecommunications network (i.e. network-internally) such that an optical spectral window (or even a plurality of optical spectral windows) is provided throughout the transmission path between the optical safety and policy entity or functionality and the further optical safety and policy entity or functionality.

Furthermore, according to the present invention, it is advantageously possible to provide the communication or connectivity service (or lambda service) as a complement to service offerings at the IP layer (i.e. providing end-user communication services and/or IP connectivity). Especially, the lambda service provides for a free transmission—using the optical spectral window—of any possible protocol without principal technical limitations by the network elements used by the host (hosting carrier), i.e. the transporting telecommunications network. As the carrier (i.e. the telecommunications network) still needs control, the present invention provides a solution to support such unlimited lambda services with comprehensive control options by the host telecommunications network.

According to the present invention, it is furthermore advantageously possible that the customer of the lambda service (i.e. the user feeding or inputting the user-defined optical signal at the first location and receiving it at the second location) is able to use their own optical interfaces (transmitter and receiver) while the service provider (i.e. the telecommunications network) only supplies the fiber network for optical interconnection, typically in a defined optical spectral range or optical window.

According to the present invention, there are different modes of operation, especially regarding how the first location is connected to the telecommunications network, or its aggregation network infrastructure and/or backbone network infrastructure:

- according to a first mode, a passive fiber network is used, e.g. the network provider (i.e. the telecommunications network) supplies a fiber link or a fiber network (e.g. PON tree network);
- according to a second mode, an active fiber-optical network is used, e.g. the network provider (i.e. the telecommunications network) supplies an amplified and channelizable (optical) network, i.e. a WDM network (wavelength division multiplex network) with optical amplifiers and spectral filters, maybe even switchable optical nodes (ROADMs, reconfigurable optical add drop multiplexers).

It is furthermore advantageously possible according to the present invention that the optical signal (i.e. the user-defined optical signal) being delivered by the customer (of the telecommunications network) itself can be used as agnostic underlay layer for any other higher-layer protocols on top (e.g. for Layer 1/OTN services, for Layer 2/Ethernet services, for Layer 3/IP services and/or SD-WAN (software defined wide area network)/OTT (over the top) or else). Furthermore, it is advantageously possible according to the present invention that the end-to-end lambda service is managed by a disaggregated architecture, including several user plane (UP) and control plane (CP) functional building blocks that are placed especially at central office points of delivery (PODs), at network elements along the service route, at hierarchical controller and orchestrator entities and OSS/BSS entities. Via maintaining the optical modulation scheme throughout the transmission path of the user-defined optical signal, it is advantageously possible that the user-defined optical signal is received, at the second location, as it is (or has been) fed or input at the first location, i.e. essentially without (necessarily) being modified between the first and second location. In other words, the transmission functionality regarding the backbone network and/or aggregation network and/or the access network is based exclusively or almost exclusively on optical data transmission (or, at least, according to the present invention—and especially via avoiding, at a respective access node or central office point of delivery, to electronically process end-user data in order to provide the communication or connectivity service—it is possible to provide for a network-internal transmission functionality regarding the backbone network and/or aggregation network and/or the access network that is based exclusively or almost exclusively on optical data transmission). This especially refers to there being no substantial conversion of the optical signals into the electrical domain, and if yes at most for regeneration purposes of the optical signal; that there is no substantial conversion (or no conversion at all) of the optical signals into the electrical domain is the case if all-optical regenerators (or all-optical repeaters) are used for the regeneration of the optical signal but also in case that an optical signal (that is to be transmitted through the telecommunications network, especially at or between two network nodes) needs to be regenerated at a specific position along the transmission path and furthermore in case that such a specific regeneration of the optical signal requires an electrical conversion of the optical signal (and, thereafter, a back conversion to the regenerated optical signal via using an optical-electrical-optical regenerator or repeater).

The telecommunications network according to the present invention might be a fixed-line telecommunications network or a mobile communication network but could also have both aspects, i.e. parts of a fixed-line telecommunications network (or being a fixed-line telecommunications network in such parts) and parts of a mobile communication network (or being a mobile communication network in such parts); such networks are also known under the term fixed-mobile-convergence networks (FMC networks).

Furthermore, it is advantageously possible and preferred according to the present invention that the optical safety and policy entity or functionality) connects the first location and/or the first optical data transmission fiber to the telecommunications network, especially to its network-internal transmission functionality, and wherein the further optical safety and policy entity or functionality) connects the second location and/or the second optical data transmission fiber to the telecommunications network, especially to its network-internal transmission functionality, wherein the optical safety and policy entity or functionality, the further optical safety and policy entity or functionality as well as the network orchestrator entity or functionality control the plurality of optical network nodes to establish or to define the network-internal transmission functionality.

Thereby, it is advantageously possible to comparatively easily realize a peer-to-peer transmission path, through the aggregation and backbone network, between the optical safety and policy entity or functionality and the further optical safety and policy entity or functionality, and, as a consequence, also between the first and second location.

According to a further preferred embodiment of the present invention, the network-internal transmission functionality is established or defined via calculating and establishing the at least one transmission path as an optical route between the optical safety and policy entity or functionality and the further optical safety and policy entity or functionality, especially using a control plane interconnection between the network orchestrator entity or functionality and the plurality of optical network nodes or part thereof, wherein especially—in addition to a user plane optical route between the optical safety and policy entity or functionality and the further optical safety and policy entity or functionality—an IP-based control plane is established and defined between the optical safety and policy entity or functionality and the further optical safety and policy entity or functionality, wherein especially the user plane optical route is different from the IP-based control plane, wherein especially, in order to define the user plane optical route, an optical path switching is used, especially source-initiated, and especially using optical segment switching, wherein especially the telecommunications network comprises a path computation entity or functionality as part of or connected to or associated with the network orchestrator entity or functionality, wherein the path computation entity or functionality especially calculates the user plane optical route, especially taking into account shared risk groups, lambda blocking constraints and/or the topology of the telecommunications network.

Thereby, it is advantageously possible to easily and effectively implement a method according to embodiments of the present invention. According to the present invention, it is advantageously possible to provide for a centrally controlled establishment and/or definition of the network-internal transmission functionality, especially via the network orchestrator entity or functionality controlling the optical network nodes in order to provide (or to switch) the optical network-internal path. Alternatively, it is also advantageously possible to provide for an establishment or realization of the network-internal transmission functionality or transmission path among the plurality of optical network nodes via using centrally defined pieces of transmission path information in combination with source-initiated optical routing or switching, especially via using optical segment switching.

According to a further preferred embodiment of the present invention, regarding the establishment of the user plane optical route and between two consecutive optical nodes, a segment optical switching identifier information is transmitted at least between two consecutive optical network nodes, wherein especially one of the two consecutive optical nodes corresponds to a source optical node and the other corresponds to a destination optical node, wherein the destination optical node comprises a probe optical branch, wherein the probe optical branch detects and determines the segment optical switching identifier information and selects and/or controls the destination optical node according to the content of the segment optical switching identifier information.

Especially, the telecommunications network comprises at least a subset of optical nodes such that each optical node of the subset of optical nodes comprises the probe optical branch; e.g., the optical nodes of the subset of optical nodes are arranged along a transmission path within the telecommunications network, especially of its backbone network, and/or form a sub-network or a part of the backbone network of the telecommunications network. Among such a number of optical nodes (or among such a subset of optical nodes) the segment optical switching identifier information is at least transmitted between consecutive optical network nodes; according to a further embodiment of the present invention either the segment optical switching identifier information or at least a part of the segment optical switching identifier is transmitted not only between consecutive optical network nodes but along a transmission path of (or provided by) the network-internal transmission functionality, i.e. between a plurality of optical network nodes and along the considered transmission path. The segment optical switching identifier information is especially provided as a modulation of the user plane signal, i.e. the user-defined optical signal. Via the respective probe optical branch, each one of the optical network nodes (or, at least, each one of the network nodes of the subset of optical network nodes) that is receiving a user plane signal—i.e. the considered user-defined optical signal—is able to receive and process the modulation signal and to read or detect the respective segment optical switching identifier information. The specific (or respective) segment optical switching identifier information, received at a respective (or considered) optical network node, especially comprises a switching information or switching indication or a reference or indication related to or referring to a transmission path such that the respective (or considered) optical network node is able to apply a switching decision (e.g. select a first consecutive optical network node instead of a second consecutive optical network node).

Thereby, it is advantageously possible according to the present invention that the user plane optical route is established or defined, at least partly, via communication between consecutive optical nodes of the telecommunications network, especially of the backbone network and/or the aggregation network.

Furthermore, it is advantageously possible and preferred according to the present invention that both the optical safety and policy entity or functionality, and the further optical safety and policy entity or functionality, respectively, provide for protection of the optical transmission functionality, especially with regard to the backbone network and/or the aggregation network, a policy decision functionality, and a policy enforcement functionality regarding the first and/or second optical signal, wherein thereby the communication or connectivity service between the first location and the second location is able to be realized as an optical and transparent user plane point-to-point connection, wherein especially the broadband access network comprises at least one central office point of delivery comprising or being coupled with the optical safety and policy entity or functionality.

Via using the optical safety and policy entity or functionality (and the further optical safety and policy entity or functionality), it is advantageously possible to connect the first location or the first optical data transmission fiber (or, alternatively or cumulatively, the second location or the second optical data transmission fiber) more or less directly to the optical domain of the telecommunications network, i.e. especially the aggregation network and/or the backbone network, and thereby to provide for an all-optical (or at least almost all-optical) transmission link between the first and second location (and, likewise, in opposite direction, from the second location to the first location). The protecting functionality of the optical safety and policy entity or functionality as well as the policy decision and policy enforcement functionalities ensure that the telecommunications network is protected and the communication or connectivity service is used according to agreed service level agreements, SLA.

Preferably according to the present invention, such protection applies regarding any signal (also regarding a (further) optical initialization signal), and especially is applied generally or continuously; this feature being especially important as third-party (customer-defined) hardware is used at the ends of the first and/or second optical data transmission fibers (i.e. at the first and second locations) that the operator of the telecommunications network does not necessarily control.

Furthermore, according to a preferred embodiment of the present invention, the broadband access network comprises at least one central office point of delivery, the at least one central office point of delivery especially comprising or being coupled with the optical safety and policy entity or functionality, and wherein the broadband access network comprises a further central office point of delivery, the at least one further central office point of delivery especially comprising or being coupled with the further optical safety and policy entity or functionality.

Thereby, it is advantageously possible to easily and effectively implement a method according to embodiments of the present invention.

Furthermore, it is advantageously possible and preferred according to the present invention that the central office point of delivery comprises a plurality of access nodes and an orchestrator entity or functionality, wherein the plurality of access nodes especially provide optical network termination functionality to one or a plurality of end-users in view of the end-users being provided with IP connectivity by the telecommunications network, wherein the end-users are connected to the telecommunications network via access network infrastructure, especially at least partly optical fiber infrastructure.

Thereby, it is advantageously possible to easily and effectively implement a method according to embodiments of the present invention.

According to a further embodiment of the present invention, the first location is connected to the central office point of delivery, via the first optical data transmission fiber, using at least one of the following:

a passive optical fiber as a point-to-point link, an active optical fiber, i.e. optically amplified, a passive optical network, especially a PON, e.g. XGS-PON, PON-tree or a part thereof.

Thereby, it is advantageously possible to use different possible optical connections of the first and/or second location to the telecommunications network, especially its backbone network and/or aggregation network infrastructure.

According to a further embodiment of the present invention, the user-defined optical signal corresponds to an operative signal to be transmitted between the first and second location, wherein prior to the user-defined optical signal being fed or input to the first optical data transmission fiber, an initialization signal is fed or input to the first optical data transmission fiber, wherein the initialization signal is detected by the optical safety and policy entity or functionality, and subsequently optical and transparent user plane point-to-point connection is realized between the first and second location.

Via using an initialization signal, it is advantageously possible to initialize the operative the communication or connectivity service without further relying on a control plane between the first location (or, especially, the optical transmission hardware of the customer) and the optical safety and policy entity or functionality.

Furthermore, according to an embodiment of the present invention, the communication or connectivity service between the first location and the second location is refused in case that the initialization signal is invalid, wherein especially the transmission functionality of the telecommunications network, especially with regard to the backbone network and/or the aggregation network, is protected by the optical safety and policy entity or functionality.

Thereby, it is advantageously possible to easily and effectively implement a method according to embodiments of the present invention.

Furthermore, it is advantageously possible and preferred according to the present invention that the central office point of delivery comprises a plurality of access nodes and an orchestrator entity or functionality, wherein the plurality of access nodes especially provide optical network termination functionality to one or a plurality of end-users in view of the end-users being provided with IP connectivity by the telecommunications network, wherein the end-users are connected to the telecommunications network via access network infrastructure, especially at least partly optical fiber infrastructure.

Thereby, it is advantageously possible to easily and effectively implement a method according to embodiments of the present invention.

Furthermore, the present invention relates to a broadband access network or to a telecommunications network for establishing or defining a network-internal transmission functionality for providing, via the telecommunications network, a communication or connectivity service between a first location and at least a second location based on optical data transmission of a user-defined optical signal, wherein the telecommunications network comprises a backbone network and/or an aggregation network as well as an access network, and the telecommunications network and its infrastructure being used to both

- provide end-user communication services and/or IP connectivity to a multitude of end-users connected to the access network, and
- connect the first location and the at least second location via at least access network infrastructure and/or aggregation network infrastructure comprising a plurality of optical network nodes, wherein the telecommunications network comprises a network orchestrator entity or functionality connected to the plurality of optical network nodes, respectively, and comprising a plurality of pieces of transmission path information, wherein the first location is linked to the telecommunications network via at least one first optical data transmission fiber to an optical safety and policy entity or functionality, and wherein the second location is linked to the telecommunications network via at least one second optical data transmission fiber to a further optical safety and policy entity or functionality, wherein, in order to establish or to define the network-internal transmission functionality between, on the one hand, the optical safety and policy entity or functionality, and, on the other hand, the further optical safety and policy entity or functionality, the broadband access network or the telecommunications network is configured such that the establishment or definition of the network-internal transmission functionality is triggered, and the network-internal transmission functionality is established by causing the plurality of optical network nodes to apply at least one transmission path based on at least one piece of transmission path information.

Furthermore, the present invention relates to a system for establishing or defining a network-internal transmission functionality for providing, via the telecommunications network, a communication or connectivity service between a first location and at least a second location based on optical data transmission of a user-defined optical signal, wherein the telecommunications network comprises a backbone network and/or an aggregation network as well as an access network, and the telecommunications network and its infrastructure being used to both

- provide end-user communication services and/or IP connectivity to a multitude of end-users connected to the access network, and
- connect the first location and the at least second location via at least access network infrastructure and/or aggregation network infrastructure comprising a plurality of optical network nodes, wherein the telecommunications network comprises a network orchestrator entity or functionality connected to the plurality of optical network nodes, respectively, and comprising a plurality of pieces of transmission path information, wherein the first location is linked to the telecommunications network via at least one first optical data transmission fiber to an optical safety and policy entity or functionality, and wherein the second location is linked to the telecommunications network via at least one second optical data transmission fiber to a further optical safety and policy entity or functionality, wherein, in order to establish or to define the network-internal transmission functionality between, on the one hand, the optical safety and policy entity or functionality, and, on the other hand, the further optical safety and policy entity or functionality, the network orchestrator entity or functionality is configured such that and/or the plurality of optical network nodes is configured such that the establishment or definition of the network-internal transmission functionality is triggered, and the network-internal transmission functionality is established by causing the plurality of optical network nodes to apply at least one transmission path based on at least one piece of transmission path information.

Additionally, the present invention relates to an optical safety and policy entity or functionality or to a central office point of delivery comprising an optical safety and policy entity or functionality provided to be used as part of a system or as part of a broadband access network or telecommunications network according to embodiments of the present invention.

Additionally, the present invention relates to an optical network node provided to be used as part of a system or as part of a broadband access network or a telecommunications network according to embodiments of the present invention, wherein the optical network node comprises a probe optical branch, wherein the probe optical branch is configured to detect and determine a segment optical switching identifier information and to select and/or to control the destination optical network node according to the content of the segment optical switching identifier information.

Still additionally, the present invention relates to a program comprising a computer readable program code which, when executed on a computer and/or on a network node of a telecommunications network and/or on an optical safety and policy entity or functionality, or in part on the network node of a telecommunications network and/or in part on the optical safety and policy entity or functionality, causes the computer and/or the network node of the telecommunications network and/or the optical safety and policy entity or functionality to perform a method according to embodiments of the present invention.

Furthermore, the present invention relates to a computer-readable medium comprising instructions which when executed on a computer and/or on a network node of a telecommunications network and/or on an optical safety and policy entity or functionality, or in part on the network node of a telecommunications network and/or in part on the optical safety and policy entity or functionality, causes the computer and/or the network node of the telecommunications network and/or the optical safety and policy entity or functionality to perform a method according to embodiments of the present invention.

These and other characteristics, features and advantages of the present invention will become apparent from the following detailed description, taken in conjunction with the accompanying drawings, which illustrate, by way of example, principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order; this is especially the case for the terms "first step", "second step", etc. It is to be understood that the terms so used are interchangeable under appropriate circumstances and that the embodiments of the invention described herein are capable of operation in other sequences than described or illustrated herein.

In FIG. 1, a telecommunications network 100 according to the present invention is schematically shown, having—preferably—at least a fixed line part. A mobile (or cellular) part may be present as well, as part of the telecommunications network 100. User equipments or client devices are connected to the telecommunications network 100 via a (broadband) access network 120. The telecommunications network 100 comprises, especially as part of the broadband access network 120, at least one logical or physical central office point of delivery 110 that is preferably realized within a (mini) data center and that is especially handling different access requirements, especially different access possibilities, of the client devices to network functionalities provided by the telecommunications network 100 or via the telecommunications network 100. In addition, the telecommunications network 100 typically also comprises—besides the broadband access network 120—a core network 101. The client devices are typically connected to the logical or physical central office point of delivery 110 via a customer premises equipment device 50, 50' or via a customer premises equipment functionality that might be built into or realized by the client devices. Preferably but not necessarily, the central office point of delivery 110 comprises a switching fabric 115 comprising a plurality of spine network nodes and typically also a plurality of leaf network nodes.

Figure 2:
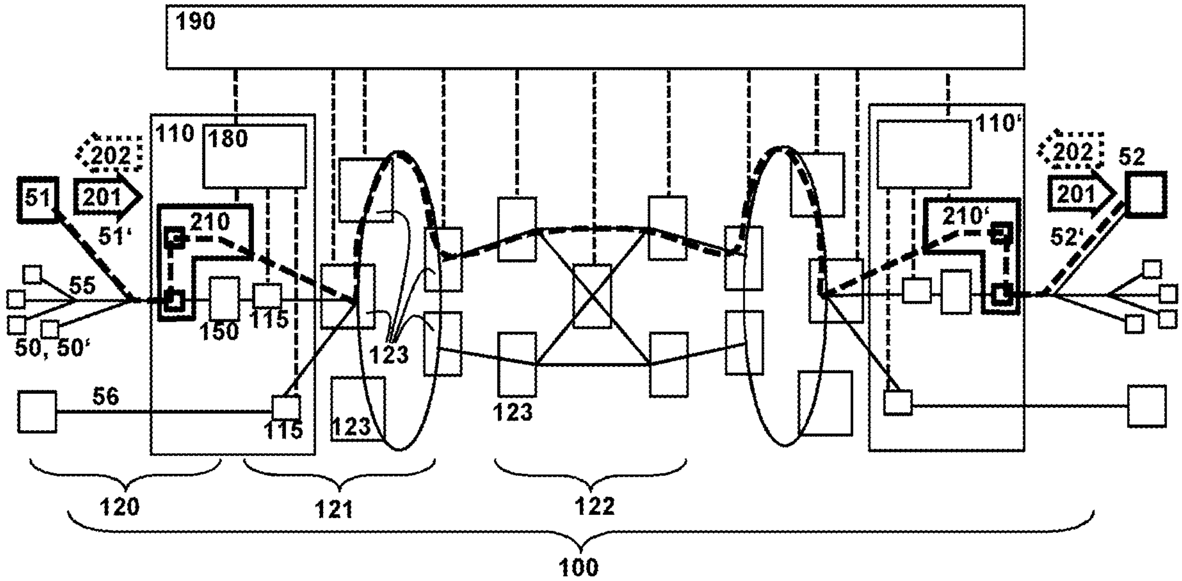
FIG. 2 schematically shows the telecommunications network providing a communication or connectivity service between a first location and a second location based on optical data transmission of a user-defined optical signal, the telecommunications network comprising a backbone network and/or an aggregation network as well as the access network.

FIG. 2 schematically shows the telecommunications network 100 providing a communication or connectivity service between a first location 51 and a second location 52 based on optical data transmission of a user-defined optical signal 201, the telecommunications network 100 comprising a backbone network 122 and/or an aggregation network 121 as well as the access network 120. Furthermore, the telecommunications network 100 comprises a network orchestrator 190.

According to the present invention, the first location 51 is linked to the telecommunications network 100 via at least one first optical data transmission fiber 51', and the second location 52 is linked to the telecommunications network 100 via at least one second optical data transmission fiber 52'. Typically according to the present invention, but not necessarily, the communication or connectivity service between the first location 51 and the at least second location 52 also involves the optical data transmission of a further user-defined optical signal 202.

Furthermore according to the present invention, the broadband access network 120 comprises an optical safety and policy entity or functionality 210 connecting the first location 51 and/or the first optical data transmission fiber 51' to the telecommunications network 100, especially to its aggregation network 121 and/or its backbone network 122, wherein the optical safety and policy entity or functionality 210 provides for protection of the optical transmission functionality (especially with regard to the backbone network 122 and/or the aggregation network 121), for a policy decision functionality, and for a policy enforcement functionality regarding the user-defined optical signal 201. Likewise, typically, the broadband access network 120 comprises a further optical safety and policy entity or functionality 210' connecting the second location 52 and/or the second optical data transmission fiber 52' to the telecommunications network 100, especially to its aggregation network 121 and/or its backbone network 122, wherein the further optical safety and policy entity or functionality 210' provides for protection of the optical transmission functionality (especially with regard to the backbone network 122 and/or the aggregation network 121), for a policy decision functionality, and for a policy enforcement functionality regarding the further user-defined optical signal 202.

In the exemplary embodiment shown in FIG. 2, the optical safety and policy entity or functionality 210 is co-located with the at least one central office point of delivery 110, and especially the central office point of delivery 110 comprises or is coupled with the optical safety and policy entity or functionality 210. Likewise in the exemplary embodiment shown in FIG. 2, the further optical safety and policy entity or functionality 210' is co-located with a further central office point of delivery 110', and especially the further central office point of delivery 110' comprises or is coupled with the further optical safety and policy entity or functionality 210'. However, this symmetrical architecture (regarding the connection of the first and the second location 51, 52 to the telecommunications network 100) is only exemplarily shown in FIG. 2, and the first location 51 is able to be linked to the telecommunications network 100 in a different manner compared to the second location 52. As part of the central office point of delivery 110, an access node 150 is schematically shown; such access nodes 150 are typically used, as part of their respective central office points of delivery 110, 110', to connect end-users 50, 50' to the access network 120, and thereby to the telecommunications network 100, as this is schematically shown in FIG. 1. Furthermore as part of the central office point of delivery 110, a switching fabric 115 (or, rather two instances of a switching fabric) is schematically shown in FIG. 2. In FIG. 2, the end-users 50, 50' are schematically shown as connected to the access network 120 via an optical communication link 55, especially a passive optical network, PON. Alternatively to using a passive optical network 55, a point-to-point connection 56, especially an optical point-to-point connection 56, is schematically shown in FIG. 2. Furthermore as part of the central office point of delivery 110, an orchestrator entity or functionality 180 is schematically shown in FIG. 2.

According to the present invention, the communication or connectivity service between the first and second location 51, 52 is able to be established (in order to transmit the user-defined optical signal 201 and/or the further user-defined optical signal 202) while still the telecommunications network 100 and its infrastructure providing (or being able to provide) the end-user communication services and/or IP connectivity to the end-users 50, 50'. According to the present invention, it is advantageously possible to transmit the user-defined optical signal 201 between the first and second location 51, 52 via, in a first step, feeding or inputting the user-defined optical signal 201 to the first optical data transmission fiber 51', and, in a second step, receiving the user-defined optical signal 201 at the second optical data transmission fiber 52'. Thereby, it is especially meant that the user-defined optical signal 201 is received at the second location 52 as it is fed or input at the first location 51, i.e. essentially without being modified between the first and second location 51, 52. Accordingly (but not necessarily as mentioned), the communication or connectivity service between the first location 51 and the at least second location 52 also involves the optical data transmission of the further user-defined optical signal 202, which is likewise fed or input (in order to be transmitted in opposing direction with regard to the user-defined optical signal 201) to the second optical data transmission fiber 52' and received at the first optical data transmission fiber 51'. This is schematically represented, in FIG. 2, via arrows and reference signs 201 and 202, respectively.

FIG. 2 schematically shows a path that the user-defined optical signal 201 takes from the first location 51 to the second location 52 through the telecommunications network 100; this path is schematically indicated via a bold dashed line in FIG. 2. In FIG. 2, the case is schematically shown that also the further user-defined optical signal 202 (travelling, or being transmitted, in opposing direction compared to the user-defined optical signal 201) takes the same path as schematically shown for the user-defined optical signal 201. However, this is not always mandatorily realized: Both the backbone network 122 and also aggregation networks 121 are schematically shown as comprising a plurality of optical network nodes 123. Typically, there are different paths through the telecommunications network 100 or its infrastructure that are possible between any first and second location, and the further user-defined optical signal 202 might well travel (or be transmitted) using a different path from the path of the user-defined optical signal 201.

Figure 3:
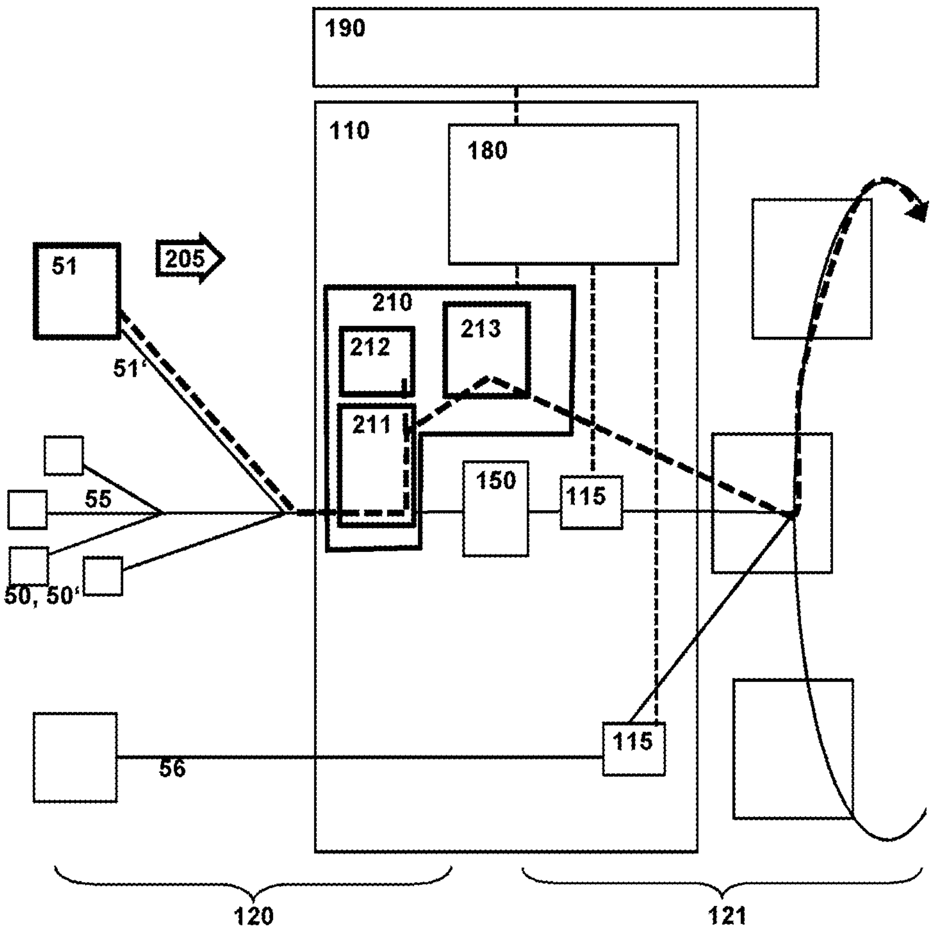
FIG. 3 schematically shows in greater detail the first location and its connection to the telecommunications network.

In FIG. 3, the first location 51 and its connection to the telecommunications network 100 is schematically shown in greater detail. Again, the first location 51 is linked to the telecommunications network 100 via the first optical data transmission fiber 51'. And again, the broadband access network 120 comprises the optical safety and policy entity or functionality 210 connecting the first location 51 and/or the first optical data transmission fiber 51' to the telecommunications network 100. The optical safety and policy entity or functionality 210 provides for protection of the optical transmission functionality, for a policy decision functionality, and for a policy enforcement functionality regarding the user-defined optical signal 201. Again, in the exemplary embodiment shown in FIG. 2, the optical safety and policy entity or functionality 210 is co-located with the at least one central office point of delivery 110. The optical safety and policy entity or functionality 210 especially comprises a splitter entity or functionality 211, an optical detection entity or functionality 212, and an optical policy enforcement entity or functionality 213.

FIG. 3 furthermore schematically shows an initialization signal 205 in order to represent a further preferred embodiment of the present invention. The initialization signal 205 is fed or input to the first optical data transmission fiber 51' in order for the communication or connectivity service between the first and second location 51, 52 to be initiated. The user-defined optical signal 201 (and likewise the further user-defined optical signal 202) corresponds to an operative signal to be transmitted between the first and second location 51, 52. However, in order to establish the communication service (i.e. the user-defined optical signal 201 being fed or input to the first optical data transmission fiber 51' and received at the second optical data transmission fiber 52'), the initialization signal 205 is fed or input to the first optical data transmission fiber 51'. The initialization signal 205 is detected by the optical safety and policy entity or functionality 210, and subsequently an optical and transparent user plane point-to-point connection is realized between the first and second location 51, 52. However, this communication or connectivity service is refused in case that the initialization signal 205 is invalid. Thereby, it is—inter alia—advantageously possible to protect the transmission functionality of the telecommunications network 100, especially with regard to the backbone network 122 and/or the aggregation network 121.

According to the present invention, the manner of production of the lambda service (passive and active fiber based) or lambda services are preferably embedded, within a disaggregated network architecture, with the central office point of delivery 110 110' between the access network 120 and the transport network (aggregation 121 and core network domains 122 (or backbone network 122)). In this manner, the central office point of delivery 110, 110' is especially an important network node which combines a set of multiple disaggregated functions of the service and network user plane (UP), the control plane (CP) and the management plane (MP).

The end-to-end production, i.e. connectivity between the first and second locations 51, 52, of the lambda services has to be realized over different network domains: The service starts at the first location 51 that especially correspond to the customer premises of the user or customer using the communication or connectivity service or lambda service: The network termination of the network provider (i.e. the telecommunications network 100) is especially a pure fiber tail, no further technical equipment. The technical equipment, the network termination (NT) with the laser-optical transmitter and receiver will be provided by the customer and there is a flexible choice.

The optical signal (i.e. the user-defined optical signals 201, 202) being delivered by the customer itself can be used as agnostic underlay layer (Layer 0) for any other higher-layer protocols on top (e.g. for Layer 1/OTN services, for Layer 2/Ethernet services, for Layer 3/IP services and/or SD-WAN/OTT or else).

The optical signal from the customer is connected via fiber (passive or active, i.e. optically amplified fiber) through the access network 120 with the central office point of delivery 110, 110'.

The central office point of delivery 110, 110' (or, rather the optical safety and policy entity or functionality 210, 210', being located at the central office point of delivery or co-located) is the first entrance point, detects the first sign of life (i.e. the initialization signal 205), it unlocks the connection, it controls the properties of the service via policy decision and policy enforcement functions. The central office point of delivery 110 (i.e. the optical safety and policy entity or functionality 210) connects the lambda service from the access with the next network domain, the aggregation network 121.

The lambda service is routed through the aggregation network 121 to all adjacent networks (aggregation and backbone networks 121) and from there to its destination location (second location 52)—especially at another premises of the customer. For a point-to-point lambda connection, two optical safety and policy entity or functionalities 210, 210' (or two central office points of delivery 110, 110') are typically engaged.

The end-to-end lambda service is managed by a disaggregated architecture, including several user plane (UP) and control plane (CP) functional building blocks that are especially placed at the central office points of delivery, at network elements along the service route, at hierarchical controller and orchestrator entities and OSS/BSS entities.

According to the present invention and while operatively using the communication or connectivity service between the first and second location 51, 52 (also called lambda network termination 1 (λ-NT1) and lambda network termination 2 (λ-NT2)), a customer (of the telecommunications network 100) may launch independently any optical spectrum, any modulation format, any protocol (to the first optical data transmission fiber 51'). All this is not limited by the first (customer initiated) initialization processing step. The network will restrict the parameters according to network safety and to the SLA contract in the (operative) second processing step and over the whole service life-cycle. Especially according to the present invention, this is done not end-to-end (i.e. between the first and second location 51, 52) but from the optical safety and policy entity or functionality 210 to the further optical safety and policy entity or functionality 210' (or vice versa for the further user-defined optical signal 202, and especially regarding control of CP (control plane) and UP (user plane), provisioning, OS&R, assurance, network safety); as the optical safety and policy entity or functionality 210 and the further optical safety and policy entity or functionality 210' are typically co-located with a respective central office point of delivery 110, 110', it is also possible to say that this is done from central office point of delivery to the further central office point of delivery (or vice versa). This results in a network-controlled-but-transparent optical connectivity service between λ-NT1 and λ-NT2.

According to the present invention, the access connectivity is remotely gated by the optical safety and policy entity or functionality 210 (as the network gateway), or by the respective central office point of delivery 110; the customer edge is not manipulated by the network operator of the telecommunications network 100, and there is no in-band core plane connectivity of customer NTs needed, as it is advantageously possible that the customer NTs are fully self-managed, and the control plane or the management plane (regarding end-to-end communication between the first and second location 51, 52) is able to be 100% decoupled from the telecommunications network 100. Hence, an end-to-end management is advantageously possible to be implemented by an interactivity of optical safety and policy entities or functionalities (or central office points of delivery) and an overarching network orchestrator 190 or software defined network control architecture; in FIG. 2, this is schematically indicated by vertical dashed lines starting at the network orchestrator entity or functionality 190.

In the following, the processing step to set up the communication or connectivity service between the first and second location 51, 52 are detailed:

The first sign of life comes from the customer.

The customer may plug any device and may inject any light or signal into a “dark fiber end” (of the first optical data transmission fiber 51') at their premises location (or first location 51, or whatever location where a dark fiber end of the network operator who offers the lambda or spectrum services is available).

The central office point of delivery 110 (or, rather, the optical safety and policy entity or functionality 210) detects this first sign-of life but still blocks all optical spectrum that is not already administered for service.

The central office point of delivery 110 (or, rather, the optical safety and policy entity or functionality 210) still also blocks the optical light from the customer and ensures laser safety of the entire active fiber-based transport network behind the central office point of delivery 110/optical safety and policy entity or functionality 210.

The central office point of delivery 110 (or, rather, the optical safety and policy entity or functionality 210), especially a control plane function module thereof, such as the orchestrator entity or functionality 180, analyses the incoming light (spectrum, amplitude/power) and additional ID (identity information) signals (e.g. in-band low frequency modulation signal or an ID signal at a certain dedicated frequency portion) if any are available; else the optical safety and policy entity or functionality 210/central office point of delivery 110 asks the overarching network orchestrator 190 (or other kind of platform control) or directly the OSS/BSS (operations support system/business support system) or the BSS for the permission to provision a lambda or spectrum service (communication or connectivity service) for the customer who had launched light into the considered dark fiber tail. If topological data and frequency fit to the BSS information, a first authentication step is fulfilled.

The optical safety and policy entity or functionality 210/central office point of delivery 110 also receives service parameters of the customer contract (SLAs). If the spectrum is too broad, the optical safety and policy entity or functionality 210/central office point of delivery 110 will cut the spectrum to the allowed window (the customer may be notified but not necessarily). If the light power is too high, it will be attenuated and the customer will be notified to correct its launch power.

Further SLAs can be adjusted by the central office point of delivery 110/optical safety and policy entity or functionality 210.

The central office point of delivery 110/optical safety and policy entity or functionality 210 asks the overarching orchestrator (or control) 190 to calculate and establish (switch via optical switches such as ROADMs, reconfigurable optical add drop multiplexers) the optical route through the transport network and to the destination (further) central office point of delivery 110'/further optical safety and policy entity or functionality 210' and its dedicated output fiber port (i.e. the second optical data transmission fiber 52'). The orchestrator 190 (or software defined network control) calculates and sets up the end-to-end connection and controls it over its lifetime together with the end-point central office points of delivery/optical safety and policy entities or functionalities.

The central office points of delivery/the optical safety and policy entities or functionalities and the overall orchestrator/SDN Control 190 for the transport network elements correspond to each other and enable the end-to-end service.

The working control plane connection (i.e. an IP-based control plane that also uses (of course), optical network nodes for transmission or transport purposes, but—in contrast to the user plane optical service—not using a dedicated optical spectral window) through the backbone and/or aggregation network 122, 121 (and between the endpoint optical safety and policy entities or functionalities or central office points of delivery) might follow a different path than a protection control plane connection (likewise an IP-based control plane), and these paths might be different from a user plane connection path and a further protection/restoration user plane connection path through the backbone and/or aggregation network 122, 121.

Especially according to the present invention, it is advantageously possible that a peer-to-peer-POD-POD-control-plane interconnection (p2p POD CPI), i.e. a control plane interconnection between the two central office points of delivery concerned, or, rather between the two optical safety and policy entities or functionalities concerned, is especially able route 'itself' via an IP routing protocol (BGP or other IP protocols) through the network. Thereby, 'routing itself' means the route is started at one of the two central office points of delivery (source central office point of delivery 110) and with the destination IP address via a self-routing protocol, e.g. BGP (border gateway protocol).

Alternatively according to the present invention, the p2p POD CPI (i.e. the IP-based control plane) might be routed via a source-routing scheme, e.g. via segment routing with a segment ID, SID (or segment identifier information) being setup and defined by the source central office point of delivery 110 which also defines the whole path through the network by different service-SLA-based parameters (e.g. delay optimized, traffic congestion optimized, lowest cost optimized, SRLG based availability/safety optimized).

Especially, the p2p POD User-Plane Interconnection (p2p POD UPI) is routed by the overall SDN-domain orchestrator and/or SDN control architecture that switches the optical cross connects (ROADMs) so that the dedicated lambda channel (dedicated spectral bandwidth window) is switched through the network.

The control plane and the user plane interconnection between the engaged central office points of delivery (or optical safety and policy entities or functionalities) are typically different, they can be routed differently, i.e. on different routes. And one of them or both may have protection paths as resilience backup (especially completely independent), such that the UP may have protection, the CP not or vice versa, or both may be protected. Instead of protection also a restoration or 1+N multiple protection may be provided for UP and/or CP.

According to a further embodiment of the present invention, the software defined network-based traffic steering is conducted by self steering or optical source switching (full peer-to-peer POD source steering & core node self "routing"), using a path computation element, PCE, and a database (especially as part of the orchestrator or software defined network control 190), wherein the information exchange to or from the path computation element may be in-band or independent intra/zero-trust internet routing. This is explained in the following, however the term "POD" refers to the respective central office point of delivery or to the respective optical safety and policy entity or functionality:

In a first processing step, the customer connects itself via own lambda beam with or without signal (free irradiation, not limited or controlled by the network operator).

In a second processing step, the policy decision function (PDF, part of local POD gatekeeper) of Source POD checks first sign of life and decodes the service request (by dialogue with overall platform management, i.e. OSS/BSS; this can be done via an umbrella orchestrator or any other systems that manage network and services).

In a third processing step, a network safety enforcement function (NSEF, part of local POD gatekeeper) of source POD blocks lambda without service approval or dangerous spectral or power-related properties; physical safety for network and network operation (service operation) by fast optical transmission shut-down is ensured by the NSEF. In case of no safety constraints, the PEF (policy enforcement function) takes over at the seventh processing step.

In a fourth processing step, the destination POD is identified via source-POD data-base request.

In a fifth processing step, the route request (working path or more than one resilient paths 1 or N) is triggered by the source POD, requesting it from the PCE entity (coupled with data base that contains information on network topology/infrastructure, node-link-SRG, lambda depletion situation):

- the PCE calculates the (non-protected) path or SRG-related (shared risk group-related) protection schemes (e.g. shortest-circle or 1+N protection or pre-calculated restoration);
- the PCE takes into account lambda blocking constraints, based on network topology, lambda map and lambda depletion situation;
- the PCE calculates best routes with respect to pre-configured optimization metrics, e.g. shortest source-POD-to-destination-POD route for lowest available latency;
- the PCE updates the information tables of the data base with the new lambda depletion situation.

In a sixth processing step, the source POD now modulates an optical ID on top of the customer wavelength spectrum. This is a "segment optical switching ID" (SOSID) that is read out by any optical switch in the transit path between optical switches (e.g. wavelength-selective switches (WSS)

or typically reconfigurable optical add-drop-multiplexers (ROADM)); these optical switches/ROADMs need an optical coupler (fiber based or integrated-optics based) at the input fiber port (optical probe), and an ID modulation detector at the end of this probe optical branch (photodiode/detector with electronic decoder chip). The SOSID gives a local switching command to the local ROADM in the transit core network. The optical switch (ROADM) configures and switches the light path autonomously based on the SOSID information (the local MP/CP/EMS entity of the switch). The spectrum (gridless ROADM) will be adjusted based on the SOSID information. So, the SOSID must contain next neighbor port (result from the PCE calculation) for switching the direction (mandatory) and can contain spectral window information (optional) if a free spectrum service is supported. In that case spectrum overlap avoidance and spectrum blocking will be verified by the local switch or this check is not needed because the CPE has considered it already for the path calculation (spectrum blocking included).

Especially, the following service models are possible:

- standard fixed lambda grid mode (e.g. fixed 50 GHz ITU grid for all channels and bandwidth/reach is defined only by the applied modulation format and customer transceiver capabilities;
- flexible spectrum window mode (here the spectrum can be defined more flexible, the PCE calculates optimum path and spectrum collision free E2E routes; gap bands due to difficult fit may occur, they may (e.g.) be charged to the customer's service);
- hybrid band operational mode at the same fiber: variable spectrum slot (with blocking inefficiencies but flexibility or extra extreme-bandwidth services) and a fixed channel grid spectrum window.

In a seventh processing step, the policy enforcement function (PEF, part of local POD gatekeeper) limits the optical properties with respect to the customer contract and opens the gateway at both E2E PODs (or in case of a PTMP service to all engaged PODs). The POD gateway also modulates the SOSID on top of the optical signal, thus the optical customer signal routes itself through the optical network and unlocks its own path autonomously via the SOSID information.

The optical properties like center wavelength, bandwidth, maximum transit power through the POD and even further optical signal parameters can be detected by the PDF and limited/controlled during service provisioning and during service production until the service is terminated by the NSEF and the PEF. Also, in-situ billing of the customer as well as in-situ reporting of the available and performed SLA can be derived from the data that are gained from that control process.

In an eighth processing step, protection switching or restoration is possible to be enabled:

- regarding the control plane: The control plane that combines the end-point PODs (two for PTP services, more than two for PTMP services) runs on the same optical network but typically uses a higher protocol layer of the network provider's multi-layer transport network. So, it can use standard connectivity services, e.g. via IP; so, the CP connection routes and re-routes (in case of a failure) itself via IP or is re-routed by other standard NW protocols depending on the used standard connectivity service.
- regarding the user plane: The user plane, i.e. the optical lambda or spectrum service also can switch (or reroute) itself:

There, especially the local self re-routing scheme Topology Independent Loop Free Alternate (TI-LFA) is applied. Similar optical self re-routing (or switching) can be applied by autonomous switching of the optical switches (typically ROADMs) by combining the information these optical switching nodes can read from the modulated SOSID and the information on interrupted (by failure) network links or nodes and local connectivity map (stored in the local MP/CP/EMS entity of the switch). The re-routing calculation may follow known algorithms such as TI-LFA or alternative schemes.

The optical switches may have the ability to modulate extra signals (i.e. control signals, cf. FIG. 4) onto the optical signal, so that re-routing information or network information or node (optical switch) information can be modulated enriching the SOSID by extra information for the next optical network nodes or the receiving POD.

By such an application, even a MP/CP north bound connection between the switching nodes and an overarching SDN control or orchestration 190 is able to be omitted; then even the transit core network nodes are able to be controlled by a peer-to-peer control plane (only horizonal steering without central north bound control).

The SOSID modulation typically is a narrow band optical modulation superimposed on the customer broadband modulation of the optical lambda channel. This narrow band modulation does not disturb the customer signal and is not detected at the customer receiver as being a much lower analogue signal modulation. The different additional information channels can be modulated at other low frequencies, so that the different information from SOSID by the Source POD and from the optical transit nodes of the core transport network can be separated and interpreted.

Figure 4:
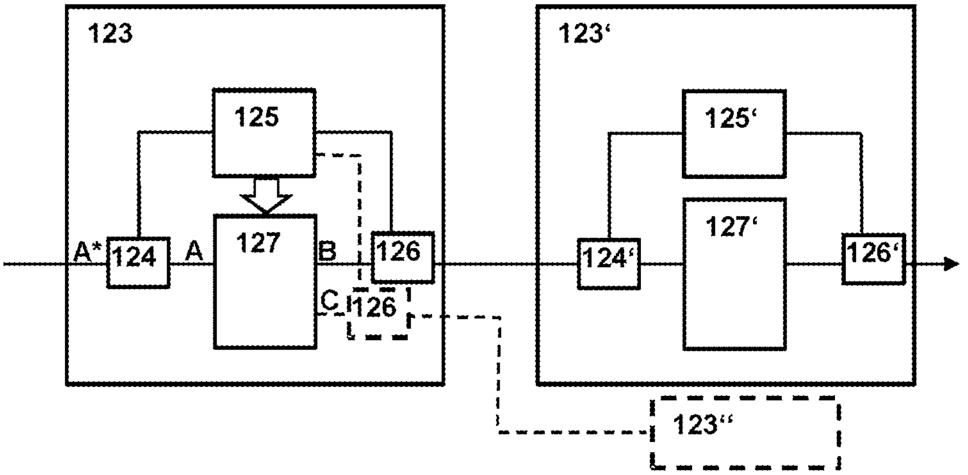
FIG. 4 schematically shows a plurality of optical network nodes or optical nodes each having a probe optical branch.

This, or at least part thereof, is exemplarily represented in FIG. 4 which schematically shows a plurality of optical network nodes (or optical nodes) 123, 123', 123", wherein each of these optical network nodes (or optical nodes) 123, 123', 123" has a probe optical branch. For the sake of simplicity, the probe optical branch is only represented for a first optical network node 123, and a second optical network node 123', whereas for a third optical network node 123" no such probe optical branch is represented in FIG. 4 (but is actually present).

The first optical network node 123 comprises an optical switching element 127. The optical switching element 127 is or corresponds to a conventionally known optical switching element 127 that is able to switch (or to transmit or to forward) an incoming optical signal—incoming at a point A (also called an optical input port A) as schematically shown in FIG. 4—either to a point B (also called an optical output port B) or to a point C (also called an optical output port C). Hence, depending on the respective configuration of the optical switching element 127, the optical (input) signal, arriving (or being fed to the optical switching element 127) at the optical input port A, is either forwarded or output at the optical output port B or at the optical output port C. In the exemplary embodiment (or part of the telecommunications network 100) shown in FIG. 4, the second optical network node 123' is connected to the optical output port B of the first optical network node 123, and the third optical network node 123" is connected to the optical output port C of the first optical network node 123; hence, depending on the respective configuration of the optical switching element 127, the optical (input) signal, arriving (or being fed to the optical switching element 127) at the optical input port A, is either forwarded or output to the second optical network node 123' (if forwarded to optical output port B) or to the third optical network node 123" (if forwarded to optical output port C). The first optical network node 123 might additionally also comprise further optical output ports (that are, for the sake of simplicity, not shown in FIG. 4) and/or further optical input ports (that are neither shown in FIG. 4). Of course, at least in principle, also the second and/or third optical network node 123', 123" is analogously configured as the first optical network node 123, and also comprise at least one input port (schematically shown in FIG. 4 but not designated via a reference sign), and at least a plurality of optical output ports (not shown in FIG. 4). Among the different optical network nodes of the telecommunications network 100 (especially of the backbone network 122 and/or of the aggregation network 121), a different number of input ports and/or output ports might be realized, especially depending on where such nodes are located and how such nodes are connected with other optical network nodes of the telecommunications network 100; however, the basic principle is as represented in FIG. 4.

According to the present invention, such optical network nodes 123, 123', 123" comprise—besides an optical switching element (the optical switching element 127 is represented in FIG. 4 with regard to the first optical network node 123, and a further optical switching element 127' is represented in FIG. 4 with regard to the second optical network node 123')—, respectively a probe optical branch. Regarding the first optical network node 123, the probe optical branch is schematically shown via reference signs 124, 125, and 126, and, regarding the second optical network node 123', the probe optical branch is schematically shown via reference signs 124', 125', and 126'.

Regarding the first optical network node 123, via a splitter element 124, a control signal is separated from (or branched of) the user plane (and user-defined) optical signal transmitted towards the first optical network node 123 (i.e. at an input port A* of the first optical network node 123) the user plane optical signal is received with the control signal; the control signal is split off at the splitter element 124, and at point A or input port A of the optical switching element 127, the user plane optical signal is fed to the optical switching element 127 either with the control signal or without the control signal. Regarding the first optical network node 123, the branched-off control signal (split off the user plane optical signal at the splitter element 124) is processed via a processing and/or control element 125; the processing and/or control element 125 is connected to the optical switching element 127 which is schematically illustrated via an downward facing arrow. This connection between the processing and/or control element 125 and the optical switching element 127 especially corresponds to a control connection via which a modification of the configuration of the optical switching element 127 is possible (i.e. especially regarding towards which output port (B or C) an incoming optical signal is to be forwarded or switched); further configuration parameters might include the applicable optical amplification and/or the kind of regeneration of the optical signal potentially performed at or by the optical switching element 127).

According to a first variant of the probe optical branch, the probe optical branch only comprises the splitter element 124, the processing and/or control element 125 and the control link or control connection of the processing and/or control element 125 towards the optical switching element 127.

According to a second variant of the probe optical branch, the probe optical branch additionally comprises—besides the splitter element 124, the processing and/or control element 125 and the control link or control connection of the processing and/or control element 125 towards the optical switching element 127—a coupler element 126, via which it is possible to add, to the optical user plane signal being output (by the optical switching element 127) either at its output port B or at its output port C, a further control signal that is transmitted, together with (or as part of) the user plane optical signal to either the second optical network node 123' or to the third optical network node 123". FIG. 4 shows an optical coupler element 126 with regard to output port B and, as well, an optical coupler element 126 (having the same reference sign) with regard to output port C; this is to illustrate that the respective optical coupler elements 126 are basically configured identically but there might be (and typically are) different further control signals to be coupled to the optical (user-defined) signals that are output at either output ports B or C of the optical switching element 127.

In FIG. 4, also the second optical network node 123' is shown to be provided with, or comprise, the (respective) probe optical branch, as well as a (further) optical switching element 127'. In a manner analogous to the probe optical branch of the first optical network node 123 (i.e. comprising the splitter element 124, the processing and/or control element 125, and, if applicable, the coupler element 126), also the second optical network node 123' comprises a (further) splitter element 124', a (further) processing and/or control element 125', and, if applicable, a (further) coupler element 126'. Furthermore in a manner analogous to the functionality of the first optical network node 123, also the (further) optical switching element 127' typically comprises a plurality of output ports in order to connect the second optical network node 123' to different subsequent optical network nodes; however, such output ports of the (further) optical switching element 127' and such different subsequent optical network nodes are not represented, in FIG. 4, for the sake of simplicity.

Between the first and second optical network node 123, 123' (or the first and third optical network node 123, 123"), the segment optical switching identifier information is transmitted together with the user plane optical (user-defined) signal along its transmission path: i.e. in the exemplary embodiment shown in FIG. 4, at least from the first optical network node 123 to the second optical network node 123' or from the first optical network node 123 to the third optical network node 123" (depending on the switching configuration of the optical switching element 127 of the first optical network node 123), i.e. the segment optical switching identifier information is transmitted at least between consecutive optical network nodes. According to a further embodiment of the present invention, either the (complete) segment optical switching identifier information or at least a part of the segment optical switching identifier information is transmitted not only between consecutive optical network nodes but along a transmission path of (or provided by) the network-internal transmission functionality, i.e. between a plurality of optical network nodes 123, 123', 123" and along the considered transmission path.

Especially according to the present invention, the segment optical switching identifier information is provided as a modulation of the user plane signal, i.e. the user-defined optical signal. Via the respective probe optical branch (and especially the corresponding splitter elements 124, 124', the corresponding processing and/or control elements 125, 125', and, if applicable, the corresponding coupler elements 126'), each one of the optical network nodes 123, 123', 123" that is receiving a user plane optical signal—i.e. the considered user-defined optical signal—is able to receive and process the modulation signal (i.e. the corresponding control signal) and to read or detect the respective segment optical switching identifier information. The specific (or respective) segment optical switching identifier information, received at a respective (or considered) optical network node, especially comprises a switching information or switching indication or a reference or indication related to or referring to a transmission path such that the respective (or considered) optical network node 123, 123', 123" is able to apply a switching decision (e.g. select a first consecutive optical network node (corresponding, in the scenario shown in FIG. 4 and regarding the first optical network node 123, to the second optical network node 123'), instead of a second consecutive optical network node (corresponding, in the scenario shown in FIG. 4 and regarding the first optical network node 123, to the third optical network node 123")). According to the present invention, the respective control signals (branched off, e.g., at the splitter elements 124, 124') and/or (if applicable) the respective further control signals (coupled or added to, e.g., at the coupler elements 126, 126') especially correspond to—compared to the frequency of the optical signals—low frequency signals (having frequencies, e.g., in the range between a couple of 10 Hz to a couple of 10 kHz or 10 MHz or up to a couple of 100 kHz or 100 MHz).

According to further embodiments of the present invention, a multicast and/or broadcast option is able to be realized:

According to a first embodiment of such a multicast and/or broadcast option of the present invention, the software defined network-based traffic steering realizes a point to multipoint (PTMP) optical lambda/spectrum services via all-optical duplicating nodes:

The network may contain optical duplication nodes that copy the optical input signal of a dedicated lambda channel to two or more (2 . . . N) output ports that leave the node at the same wavelength into different directions of meshed network.

The different branches may be routed through the network to different endpoints for point-to-multipoint optical lambda or spectrum services.

Here, the blocking, i.e. the collision of wavelengths channels or spectra, must be avoided by adequate switching (routing) of the different paths by the PCE.

The network design, the mesh degree and manyfold connectivity branches have to be adapted to the non-blocking statistical requirements.

The duplication node is an all-optical duplicator with or without optical switch function (WSS, ROADM), no opto-electric conversion is needed.

According to a second embodiment of such a multicast and/or broadcast option of the present invention, the software defined network-based traffic steering realizes a point to multipoint (PTMP) optical lambda/spectrum services via electro-optical lambda converting nodes (O/E/O).

Alternative to the above mentioned all-optical duplicating, opto-electrical duplication nodes are used.

Here, the center wavelength of the lambda channel or the spectrum is able to be changed.

The optical signal is detected and a new lambda is modulated to another wavelength. This is no new technology in itself but new as part of the described overall lambda service architecture. The advantage is the avoidance of lambda blocking.

Even though via such an implementation, the full optically-agnostic user service functionality is lost (i.e. between the first location 51 and the second location 52 via these OEO-based duplication destroying the perfect freedom of user service definition), it is nevertheless possible, according to such a variant of the present invention, to transparently forward the user-defined optical—starting from the first location 51—to the electro-optical lambda converting nodes, and from there until the second location 52, i.e. avoiding any electrical conversion at a respective access node or central office point of delivery.

Furthermore according to the present invention, remote customer premises equipment services are possible to be realized:

According to such an embodiment, the customer hardware device (or access device, here also called customer premises equipment), used at the end of the first and/or the second optical data transmission fibers 51', 52', is still decoupled but gets management information (or control plane information) from the telecommunications network 100, i.e. an in-band control plane connectivity of the customer network termination. The in-band channel means that the customer premises equipment has a decoder adapter for it. The decoder adapter may also be an SDN-controller that allows for active steering, switching and configuring the customer end device (customer premises equipment) and the user plane.

According to a first variant, optional remote customer premises equipment management plane/control plane services are used that are able to be, e.g., booked via a self-service portal, or also via in-band signaling.

Additional management plane/control plane services are able to be configured on-demand via the POD by modulation of the optical downstream beam while passing a device that is able to apply (or add) an optical modulation (amplitude or phase modulator) or by sending information via an own frequency channel within the customer band or at an external frequency/wavelength.

According to a second variant, the optional remote customer premises equipment management plane/control plane services (or the respective information) is delivered via internet connection by a service portal.

While the second variant corresponds to a solution only for "read-only" information from the operator's network and the service condition, the first variant allows for read-write control plane/management plane services that enrich the customer's service functionality. In case of fully decoupled freedom of the customer, a write control plane/management plane service is not available. In that case the customer may apply any optical customer premises equipment device, 100% free choice of end device.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for establishing a network-internal transmission functionality for providing, via a telecommunications network, a communication or connectivity service between a first location and a second location based on optical data transmission of a user-defined optical signal, wherein the user-defined optical signal is characterized by an optical modulation scheme, wherein the telecommunications network comprises a backbone network and/or an aggregation network as well as an access network, and the telecommunications network is used to (1) provide end-user communication services and/or IP connectivity to a multitude of end-users connected to the access network, and (2) connect the first location and the second location via at least access network infrastructure and/or aggregation network infrastructure comprising a plurality of optical network nodes, wherein the telecommunications network comprises a network orchestrator entity or functionality connected to the plurality of optical network nodes, respectively, and comprising a plurality of pieces of transmission path information, wherein the first location is linked to the telecommunications network via at least one first optical data transmission fiber to an optical safety and policy entity or functionality, and wherein the second location is linked to the telecommunications network via at least one second optical data transmission fiber to a further optical safety and policy entity or functionality, wherein the method comprises the following steps:

in a first step, the establishment of the network-internal transmission functionality is triggered, wherein prior to the first step, the user-defined optical signal corresponds to an operative signal to be transmitted between the first location and the second location, wherein, prior to the user-defined optical signal being fed or input to the at least one first optical data transmission fiber, an initialization signal is fed or input to the at least one first optical data transmission fiber, wherein the initialization signal is detected by the optical safety and policy entity or functionality, and wherein the establishment of the network-internal transmission functionality is triggered based on the initialization signal being valid; and in a second step, the network-internal transmission functionality is established by causing the plurality of optical network nodes to apply at least one transmission path as an optical route between the optical safety and policy entity or functionality and the further optical safety and policy entity or functionality based on at least one piece of transmission path information, wherein the optical modulation scheme is maintained throughout the at least one transmission path, wherein the network-internal transmission functionality of the telecommunications network is based on optical data transmission, and wherein the communication or connectivity service between the first location and the second location is realized as an optical and transparent user plane point-to-point connection.

2. The method according to claim 1, wherein the optical safety and policy entity or functionality connects the at least one first optical data transmission fiber to the network-internal transmission functionality, and wherein the further optical safety and policy entity or functionality connects the at least one second optical data transmission fiber to the network-internal transmission functionality; and wherein the optical safety and policy entity or functionality, the further optical safety and policy entity or functionality, and the network orchestrator entity or functionality control the plurality of optical network nodes to establish the network-internal transmission functionality.

3. The method according to claim 1, wherein the network-internal transmission functionality is established via calculating and establishing the at least one transmission path as the optical route between the optical safety and policy entity or functionality and the further optical safety and policy entity or functionality using a control plane interconnection between the network orchestrator entity or functionality and the plurality of optical network nodes or a part thereof;

wherein—in addition to a user plane optical route between the optical safety and policy entity or functionality and the further optical safety and policy entity or functionality—an IP—based control plane is established and defined between the optical safety and policy entity or functionality and the further optical safety and policy entity or functionality;

wherein the user plane optical route is different from the IP-based control plane;

wherein the user plane optical route is defined using optical segment switching; and wherein the telecommunications network comprises a path computation entity or functionality as part of or connected to or associated with the network orchestrator entity or functionality, wherein the path computation entity or functionality calculates the user plane optical route taking into account shared risk groups, lambda blocking constraints, and/or the topology of the telecommunications network.

4. The method according to claim 1, wherein, regarding establishment of a user plane optical route, segment optical switching identifier information is transmitted at least between two consecutive optical network nodes, wherein one of the two consecutive optical network nodes corresponds to a source optical network node and the other corresponds to a destination optical network node, wherein the destination optical network node comprises a probe optical branch;

wherein the probe optical branch detects and determines the segment optical switching identifier information; and wherein the probe optical branch selects and/or controls the destination optical network node according to content of the segment optical switching identifier information.

5. The method according to claim 1, wherein both the optical safety and policy entity or functionality, and the further optical safety and policy entity or functionality respectively provide for:

protection of the backbone network and/or the aggregation network, a policy decision functionality, and a policy enforcement functionality.

6. The method according to claim 1, wherein the access network comprises at least one central office point of delivery, the at least one central office point of delivery comprising or being coupled with the optical safety and policy entity or functionality, and wherein the access network comprises at least one further central office point of delivery, the at least one further central office point of delivery comprising or being coupled with the further optical safety and policy entity or functionality.

7. The method according to claim 6, wherein the at least one central office point of delivery comprises a plurality of access nodes and an orchestrator entity or functionality, wherein the plurality of access nodes provide optical network termination functionality to one or a plurality of end-users in view of the end-users being provided with IP connectivity by the telecommunications network, wherein the end-users are connected to the telecommunications network via access network infrastructure comprising at least partly optical fiber infrastructure.

8. The method according to claim 6, wherein the first location is connected to the at least one central office point of delivery, via the at least one first optical data transmission fiber, using at least one of the following:

a passive optical fiber as a point-to-point link, an active optical fiber, or a passive optical network.

9. A system for establishing a network-internal transmission functionality for providing a communication or connectivity service between a first location and a second location based on optical data transmission of a user-defined optical signal, wherein the user-defined optical signal is characterized by an optical modulation scheme, the system comprising:

a telecommunications network, wherein the telecommunications network comprises a backbone network and/or an aggregation network as well as an access network, and the telecommunications network is configured to:

provide end-user communication services and/or IP connectivity to a multitude of end-users connected to the access network; and connect the first location and the second location via at least access network infrastructure and/or aggregation network infrastructure comprising a plurality of optical network nodes;

wherein the telecommunications network comprises a network orchestrator entity or functionality connected to the plurality of optical network nodes, respectively, and comprising a plurality of pieces of transmission path information, wherein the first location is linked to the telecommunications network via at least one first optical data transmission fiber to an optical safety and policy entity or functionality, and wherein the second location is linked to the telecommunications network via at least one second optical data transmission fiber to a further optical safety and policy entity or functionality;

wherein the network orchestrator entity or functionality and/or the plurality of optical network nodes are configured such that:

the establishment of the network-internal transmission functionality is triggered, wherein prior to triggering the establishment of the network-internal transmission functionality, the user-defined optical signal corresponds to an operative signal to be transmitted between the first location and the second location, wherein, prior to the user-defined optical signal being fed or input to the at least one first optical data transmission fiber, an initialization signal is fed or input to the at least one first optical data transmission fiber, wherein the initialization signal is detected by the optical safety and policy entity or functionality, and wherein the establishment of the network-internal transmission functionality is triggered based on the initialization signal being valid, and the network-internal transmission functionality is established by causing the plurality of optical network nodes to apply at least one transmission path as an optical route between the optical safety and policy entity or functionality and the further optical safety and policy entity or functionality based on at least one piece of transmission path information, wherein the optical modulation scheme is maintained throughout the at least one transmission path, wherein the network-internal transmission functionality of the telecommunications network is based on optical data transmission, and wherein the communication or connectivity service between the first location and the second location is realized as an optical and transparent user plane point-to-point connection.

10. The system according to claim 9, wherein a respective optical network node comprises a probe optical branch, wherein the probe optical branch is configured to:

detect and determine segment optical switching identifier information; and select and/or control a destination optical network node according to content of the segment optical switching identifier information.

11. A non-transitory computer-readable medium having processor-executable instructions stored thereon for establishing a network-internal transmission functionality for providing, via a telecommunications network, a communication or connectivity service between a first location and a second location based on optical data transmission of a user-defined optical signal, wherein the user-defined optical signal is characterized by an optical modulation scheme, wherein the telecommunications network comprises a backbone network and/or an aggregation network as well as an access network, and the telecommunications network is used to (1) provide end-user communication services and/or IP connectivity to a multitude of end-users connected to the access network, and (2) connect the first location and the second location via at least access network infrastructure and/or aggregation network infrastructure comprising a plurality of optical network nodes, wherein the telecommunications network comprises a network orchestrator entity or functionality connected to the plurality of optical network nodes, respectively, and comprising a plurality of pieces of transmission path information, wherein the first location is linked to the telecommunications network via at least one first optical data transmission fiber to an optical safety and policy entity or functionality, and wherein the second location is linked to the telecommunications network via at least one second optical data transmission fiber to a further optical safety and policy entity or functionality, wherein the processor-executable instructions, when executed, facilitate performance of the following steps:

in a first step, the establishment of the network-internal transmission functionality is triggered, wherein prior to the first step, the user-defined optical signal corresponds to an operative signal to be transmitted between the first location and the second location, wherein, prior to the user-defined optical signal being fed or input to the at least one first optical data transmission fiber, an initialization signal is fed or input to the at least one first optical data transmission fiber, wherein the initialization signal is detected by the optical safety and policy entity or functionality, and wherein the establishment of the network-internal transmission functionality is triggered based on the initialization signal being valid; and in a second step, the network-internal transmission functionality is established by causing the plurality of optical network nodes to apply at least one transmission path as an optical route between the optical safety and policy entity or functionality and the further optical safety and policy entity or functionality based on at least one piece of transmission path information, wherein the optical modulation scheme is maintained throughout the at least one transmission path, wherein the network-internal transmission functionality of the telecommunications network is based on optical data transmission, and wherein the communication or connectivity service between the first location and the second location is realized as an optical and transparent user plane point-to-point connection.

* * * * *